United States Patent [19]

Pickett, Jr. et al.

[11] 4,032,517

[45] June 28, 1977

[54] PHOSPHORUS-CONTAINING COPOLYAMIDES AND FIBERS THEREOF

[75] Inventors: Oscar A. Pickett, Jr., Pensacola; John W. Stoddard, Gulf Breeze, both of Fla.

[73] Assignee: Monsanto Company, St. Louis, Mo.

[22] Filed: July 22, 1975

[21] Appl. No.: 598,505

[52] U.S. Cl. .......................... 260/78 R; 260/28 R; 260/78 A; 260/78 L; 260/78 S; 260/857 TW
[51] Int. Cl.² ................ C08G 69/26; C08G 69/42
[58] Field of Search ............. 260/78 R, 78 A, 78 L

[56] References Cited

UNITED STATES PATENTS

| | | | |
|---|---|---|---|
| 2,646,420 | 7/1953 | Morgan | 260/78 R |
| 3,043,810 | 7/1962 | Deichert et al. | 260/78 R |
| 3,108,991 | 10/1963 | Pellon et al. | 260/78 R |
| 3,213,042 | 10/1965 | Buckler et al. | 260/2 P |

FOREIGN PATENTS OR APPLICATIONS 1,012,009  12/1965  United Kingdom ............. 260/78 L

OTHER PUBLICATIONS

Journal of Polymer Science, Part A, vol. 1, pp. 863–876, 1963, Pellon et al.

*Primary Examiner*—Harold D. Anderson
*Attorney, Agent, or Firm*—John W. Whisler

[57] ABSTRACT

Copolyamides containing from 0.5 to 7.5% by weight of phosphorus as an integral part of their polymer chain are provided such as copolyamides prepared from adipic acid, hexamethylene diamine, and bis($\beta$-carboxyethyl)alkylphosphine oxide. Fibers prepared from these copolymers have permanent antistatic, moisture transport, moisture regain, and flame-resistant properties and are particularly useful in textile fiber applications such as in apparel, carpets and upholstery.

8 Claims, No Drawings

PHOSPHORUS-CONTAINING COPOLYAMIDES AND FIBERS THEREOF

BACKGROUND OF THE INVENTION

1. Field of the Invention

This invention relates to novel fiber-forming copolyamides containing from 0.5 to 7.5% by weight of phosphorus as an integral part of their polymer chains, wherein the phosphorus is present in chain-extending radicals of the formula

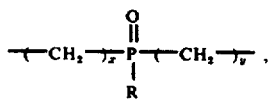

wherein R represents alkyl having from 1 to 4 carbon atoms and $x$ and $y$ each represent the integer 2 or 3. Fibers prepared from the copolyamides of the invention have permanent antistatic, moisture transport and flame-resistant properties. The term fiber as used herein includes continuous filament yarns, monofilaments, tows and spinnable staple.

2. Description of the Prior Art

Polyamide fibers such as fibers of polyhexamethylene adipamide (nylon 66) have exceptional strength and durability and are widely used in textile applications such as in carpets, apparel and upholstery. These fibers, however, lack adequate antistatic, moisture transport and moisture regain (i.e., comfort) and flame-resistant properties for certain textile fiber applications. Therefore, when polyamide fibers having these latter properties are needed, appropriate additives are used. Melt additives are normally preferred over surface coatings provided by additives since the latter are easily removed from yarns and also tend to impart a hard or harsh hand thereto. Conventionally, a melt additive or combination of melt additives is dispersed into a polyamide by mixing one or more melt additives with molten polyamide prior to fiber formation. Wax-like materials such as low molecular weight polymers comprising poly(alkylene ether) moieties, for example, the polyether waxes disclosed in U.S. Pat. Nos. 3,388,104 and 3,848,023, are very effective melt additives for use in improving the antistatic and moisture transport properties of polyamide fibers. Unfortunately, polyamide fibers which contain sufficient amounts of these wax-like materials to be adequately antistatic tend to lack desirable flame resistance for use in certain applications such as in shag carpets. While there are a few halogen-containing flame retardants such as octabromodiphenyl which might possibly be used as melt additives with the wax-containing polyamide fibers at a concentration of 6-10% o.w.p. (on weight of polymer) to improve their flame resistance, these flame retardants generally have poor dye light fastness and therefore are not suitable for most textile fiber applications. Additionally, loading fibers with large amounts of melt additives of any type is undesirable. Not only are melt additives costly and require additional processing steps, but they give rise to spinning difficulties and also tend to reduce the strength of the resulting fibers. Moreover, melt additives tend to exude from polyamide fibers and therefore the properties imparted to the fibers by their use are not permanent.

Polyamides containing phosphorus as an integral part of their polymer chains are described in the prior art, for example, U.S. Pat. No. 2,646,420 discloses high shrinkage fibers of polyamides containing recurring

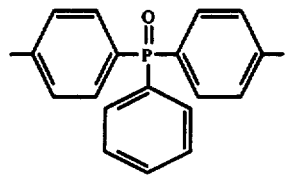

radicals and British Pat. No. 1,012,009 discloses low melting films of a polyamide containing recurring

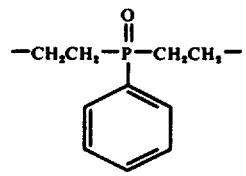

radicals. These fibers and films reportedly are flame-resistant. However, neither have good antistatic or moisture regain transport properties and, therefore, melt additives would nevertheless be needed for their use in certain applications. U.S. Pat. No. 3,108,991 discloses water-soluble, flame-resistant homopolyamides containing, for example, recurring

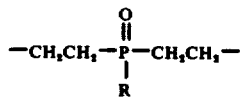

radicals, where R is a lower alkyl. These homopolyamides are not capable of being made into useful fibers. However, even if they could be made fiber-forming, their water-solubility would render them completely unsatisfactory for use in apparel, carpet and upholstery application.

It will be apparent to those skilled in the art that it would be highly desirable to provide polyamides which can, without the use of additives, be made into useful textile fibers having in combination permanent antistatic, moisture transport, moisture regain, and flame-resistant properties.

It is therefore an object of the present invention to provide such polyamides and also to provide useful fibers made therefrom.

SUMMARY OF THE INVENTION

The present invention provides linear, fiber-forming, phosphorus-containing copolyamides from which fibers having in combination permanent antistatic, moisture transport, moisture regain, and flame-resistant properties can be prepared without the use of additives. The copolyamides of the invention consist of structural units linked by amide groupings and contain from about 0.5 to about 7.5% by weight of phosphorus as an integral part of their polymer chains, wherein the phosphorus is present in recurring structural units of the formula

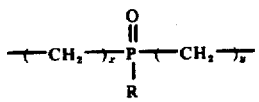

in which $x$ and $y$ each represent the integer 2 or 3 and R represents an alkyl having from 1 to 4 carbon atoms. Representative copolyamides of the present invention consist essentially of recurring units of the formulas:

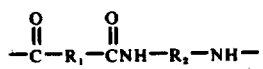  (I)

and/or

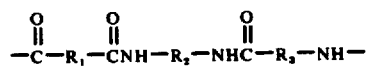  (II)

in combination with one or more of the following:

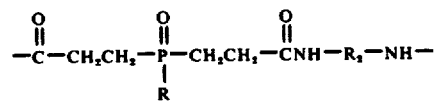  (III)

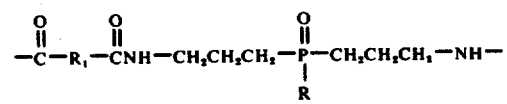  (IV)

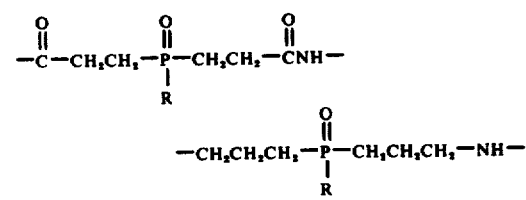  (V)

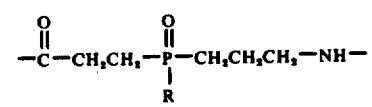  (VI)

wherein $R_1$ and $R_2$ each represent a divalent organic radical having from 4 to 12 carbon atoms, $R_3$ represents a divalent organic radical having from 5 to 10 carbon atoms and R represents an alkyl having 1 to 4 carbon atoms, wherein successive R, $R_1$, $R_2$ and $R_3$ radicals, when present in the polymer units may be the same or different and wherein the copolyamides contain a sufficient number of units selected from units (III) to (IV) to provide copolyamides containing from about 0.5 to 7.5% by weight of phosphorus as an integral part of their polymer chains.

Fibers made from the copolyamides of the present invention in addition to having permanent antistatic, moisture transport and flame-resistant properties also have good tensile properties, dye light fastness characteristics, whiteness and are nontoxic.

The antistatic, moisture transport and flame retardant properties of fibers made from copolyamides of the present invention may be controlled by varying the phosphorus content thereof. As the phosphorus content of the copolyamides increases, each of the specified properties improves. Fibers prepared from copolyamides containing between 6 and 7% o.w.p. have exceptional antistatic and moisture transport properties and have flame-resistant properties which are self-extinguishing in nature, that is, when a flame source in contact with the fibers is removed, the fibers will not burn. Thus, since the copolyamide fibers of the invention inherently have enhanced flame-resistant properties, melt additives, such as polyether waxes, may be dispersed therein without reducing the flame resistance thereof to an unacceptable level. For example, a small amount of a polyether wax (e.g., 4–6% o.w.p.) may be incorporated into copolyamide fibers of the present invention to further enhance the antistatic and moisture transport properties thereof and to impart soil hiding properties and a desirable luster thereto without reducing the flame resistance thereof to an undesirable level.

The copolyamides of the present invention may be prepared and made into fibers by conventional techniques commonly employed in the art for producing polyamides and fibers thereof.

DESCRIPTION OF THE PREFERRED EMBODIMENTS OF THE INVENTION

Copolyamides of this invention may be prepared by condensation of difunctional polyamide-forming reactants, e.g., diamines and dicarboxylic acids or an amide-forming derivative of dicarboxylic acids and/or lactams or aminocarboxylic acids or an amide-forming derivative of aminocarboxylic acid, by conventional techniques, such as by melt polymerization or solution polymerization. Generally, when one or more of the difunctional reactants is an aromatic diamine, such as para- or meta-phenylene diamine, the copolyamide is prepared according to conventional solution polymerization techniques by reaction of the diamine with the acid chloride of the dicarboxylic acid in the appropriate solvent (e.g., dimethylacetamide). Interfacial polymerization may also be used. Fibers may be made from copolyamides of the invention by conventional melt spinning or solution spinning techniques.

Preferred copolyamides of the invention may be conveniently prepared from dicarboxylic acids and aliphatic diamines by conventional melt polymerization in which an aqueous solution of an appropriate mixture of two or more diamine-dicarboxylic acid salts is heated to remove water and effect polymerization. Each salt is conveniently prepared by simply mixing substantially equimolar amounts of a dicarboxylic acid and an aliphatic diamine in water. The salts then may be isolated from their respective solutions and combined in water to provide an aqueous solution of salts or the individual salt solutions may be combined.

Preferred dicarboxylic acids useful in making the diamine-dicarboxylic acid salts are of the formula

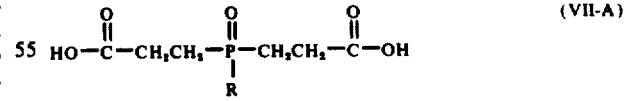  (VII-A)

and

  (VII-B)

where R represents an alkyl having from 1 to 4 carbon atoms and $R_1$ represents a hydrocarbon radical having from 4 to 12 carbon atoms, for example, a polymethylene (e.g., tetramethylene or octamethylene), metaphenylene and para-phenylene, or cycloaliphatic radicals such as

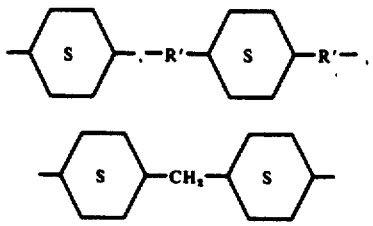

or the corresponding 1,3-radicals, where

represents a cyclohexane ring and —R'— represents —CH$_2$— or —CH$_2$CH$_2$—. Preferred diamines useful in making the diamine dicarboxylic acid salts are of the formula

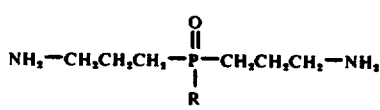 (VIII-A)

and

 (VIII-B)

where R represents an alkyl having 1 to 4 carbon atoms and R$_2$ represents a hydrocarbon radical having 4 to 12 carbon atoms, for example, polymethylene (e.g., hexamethylene), meta-phenylene, para-phenylene, or cycloaliphatic radicals such as

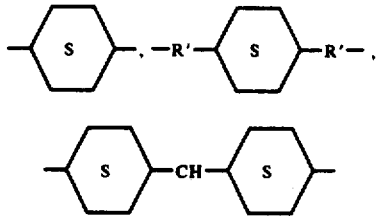

or the corresponding 1,3-radicals, where

represents a cyclohexane ring and —R'— represents —CH$_2$— or —CH$_2$CH$_2$—.

In making the copolyamides of the invention at least one of the salts must be formed from reactants which include a Formula (VII-A) dicarboxylic acid and/or a Formula (VIII-A) diamine.

Specific examples of salt mixtures which may be used in preparing copolyamides of the invention are the following:

1. hexamethylenediamine salts of adipic acid and bis($\beta$-carboxyethyl)methylphosphine oxide or bis($\beta$-carboxyethyl)ethylphosphine oxide;
2. hexamethylenediamine salts of terephthalic acid, adipic acid and bis($\beta$-carboxyethyl)methylphosphine oxide or bis($\beta$-carboxyethyl)ethylphosphine oxide;
3. a mixture of the hexamethylenediamine salt of adipic acid and the bis(3-aminopropyl)methylphosphine oxide salt of adipic acid;
4. a mixture of the bis(3-aminopropyl)methylphosphine oxide salt of bis($\beta$-carboxyethyl)methylphosphine oxide or bis($\beta$-carboxyethyl)ethylphosphine oxide and the hexamethylenediamine salt of adipic acid.

Also, it is contemplated that e-caprolactam (e-aminocaproic acid) may be added to any of the salt mixtures to provide copolyamides containing recurring units of the formula

In addition to or instead of adding caprolactam, another lactam of the general formula (IX)

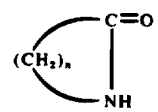

where n represents an integer from 5 to 10 or a lactam of the general formula (X)

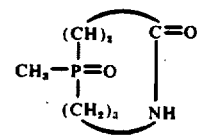

may be added to the salt mixture.

Other examples of salts and/or lactams which may be used to produce the copolyamides of this invention will be apparent to those skilled in the art. If desired, the reactant or reactants may contain one or more substituents which are unreactive under conditions employed to prepare the copolyamides. Such substituents will be apparent to those skilled in the art.

According to one embodiment of the invention block copolyamides are prepared by melt blending appropriate amounts of a polyamide consisting of repeating units of the formula

 (XI)

with a polyamide consisting of repeating units of the formula

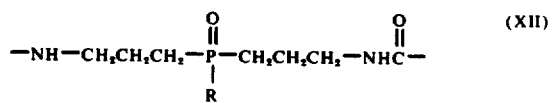 (XII)

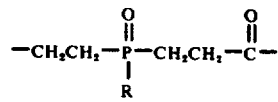

wherein R, R$_1$, R$_2$ and R$_3$ have the same meaning as previously defined herein. In a particularly preferred embodiment, R represents methyl, R$_1$ represents hexamethylene and R$_2$ represents tetramethylene. The melt blending may be accomplished by adding molten Formula (XII) polyamide to molten Formula (XI) polyamide with sufficient stirring to provide a homogeneous blend without causing bubbling. The resulting blend must be extruded into fiber within a short period of time, otherwise, significant amide interchange will take place resulting in a random, rather than block, copolymer. Normally, block copolymers are obtained when the blending is accomplished within 30 minutes, for example, between 5 and 30 minutes. It has been found that fibers prepared from block copolymers of the invention have lower boiling water shrinkage values, higher melting points, slower dye up-take rates, better moisture transport and antistatic properties than corresponding yarns prepared from random copolymers consisting of the same recurring units.

From the standpoint of cost and availability of reactants copolymers prepared from appropriate mixtures of reactants selected from adipic acid, terephthalic acid, isophthalic acid, hexamethylene adipamide, caprolactam, bis($\beta$-carboxyethyl)methylphosphine oxide, bis($\beta$-carboxyethyl)ethylphosphine oxide, bis(3-aminopropyl)methylphosphine oxide and bis(3-aminopropyl)ethylphosphine oxide are economically desirable and therefore represent preferred embodiments of the invention with the methylphosphine oxide reactants being particularly preferred.

The following examples are given for purposes of further illustrating the invention and are not to be considered to limit the scope thereof. In the examples methylphosphine oxide compounds (examples 1–7) and ethylphosphine oxide compounds (example 8) are used in making the copolyamides described therein since these compounds are more easily obtainable than the corresponding propyl- or butylphosphine oxide compounds. The following abbreviations are used in the examples:

CEMPO — bis($\beta$-carboxyethyl)methylphosphine oxide
AMPO — bis(3-aminopropyl)methylphosphine oxide
HMD — hexamethylenediamine
AdOH — adipic acid
Nylon 66 salt — the salt of AdOH and HMD
Nylon 66 — condensation polymer of Nylon 66 salt
CEMPO-HMD salt — salt of CEMPO and AdOH
CEMPO/6 polymer — condensation polymer of CEMPO-HMD salt
AdOH-AMPO salt — the salt of AdOH and AMPO
6/AMPO polymer — condensation polymer of AdOH-AMPO salt
CEMPO-AMPO salt — the salt of CEMPO and AMPO
CEMPO/AMPO polymer — the condensation polymer of CEMPO-AMPO salt
CEEPO — bis($\beta$-carboxyethyl)ethylphosphine oxide
CEEPO-HMD salt — the salt of CEEPO and HMD

EXAMPLE 1

This example illustrates the preparation of yarns made from random copolyamides of the present invention and the antistatic and flame-resistant properties of these yarns.

To a stainless steel, high pressure autoclave there was charge 90 grams (0.344 moles) of nylon 66 salt and a salt solution which consisted of 25.073 grams (0.077 moles) of CEMPO-HMD salt in 50 ml. of water and which had been prepared by first dissolving POH in water and then adding aqueous HMD solution (83.47% by wt. HMD) thereto until the pH thereof reached 7.8. The autoclave was stirred, purged and pressurized with nitrogen to a pressure of 250 psig (18 atm.). The contents of the autoclave were slowly heated to 243° C. during which time water was removed as condensated. The pressure within the autoclave was then gradually reduced to atmospheric pressure over a 25-minute period during which time the temperature increased to 280° C. The resulting copolymer melt was then allowed to equilibrate at these conditions for an additional 30 minutes. The molten copolymer was melt-spun directly from the bottom of the autoclave through a six-hole spinneret into yarn (Yarn 1A) which was drawn to approximately 70 denier. The yarn was composed of a random copolymer which contained 2.4% by weight of phosphorus as an integral part of its polymer chain and consisted of recurring units of the formulas:

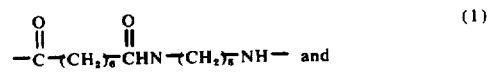 (1)

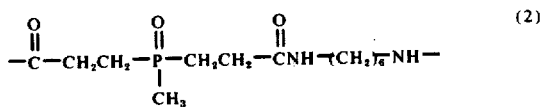 (2)

in a mole ratio of about 82:18 units (1) to units (11). Three additional yarns (Yarns 1B–1D) were also prepared from nylon 66 salt and CEMPO-HMD salt and a control yarn (Yarn 1E) from nylon 66 salt using the foregoing procedure.

The yarns were tested to determine their antistatic properties using an apparatus as manufactured by Hayek and Chroney (Am. Dyest Report, 40, p. 164, 1951). Each yarn in the form of a knit tubing test fabric, 4 inches (10.2 cm.) in diameter, was home laundered using an electric washing machine (Sears and Roebuck) in which the fabric was agitated in 60° C. water for 20 minutes with a detergent (Tide), rinsed, and then tumbled dry for 3 minutes at 70° C. The laundered fabric was then conditioned for 24 hours at either 40 or 50% relative humidity (RH) and 24° C. just prior to testing. In the testing the test fabric was placed around an aluminum wheel of the apparatus. An electrostatic charge was then imparted to the sample fabric surface by rotating the wheel at a constant speed of 300 rpm against a stationary nylon 66 fabric. After 1 minute of rubbing, contact between the two fabrics was broken, and while the aluminum wheel with the test fabric attached thereto continued to rotate, the time required for one half of the generated static charge imparted to the sample fabric surface to dissipate, i.e., static decay half-life ($t_{1/2}$) was measured and is given in the following table.

TABLE 1

| Yarn | % P | Static Decay 40% RH | Half-Life (sec.) 50% |
|---|---|---|---|
| 1A | 2.4 | — | 10 |
| 1B | 3.2 | 20 | 2 |
| 1C | 3.9 | 7 | 2 |
| 1D | 6.0 | 2 | 1 |
| 1E | — | 2820 | 390 |

The results in Table I illustrate the exceptional antistatic properties of yarns made from copolyamides of the present invention when compared to nylon 66 yarns.

The flame-resistant properties of the yarn were also tested by a procedure in which a sample 22 inches (55.88 cm.) in length and prepared by combining 100 strands of the yarn was subjected to successive ignitions until the entire sample was consumed. In the test the sample was clamped in a vertical position within and from the top of draft-free chamber under ambient conditions. The chamber was 1 ft. (30.48 cm.) wide × 1 ft. (30.48 cm.) long × 3 ft. (91.44 cm.) high with openings at the top. The yarn sample when clamped within the chamber was approximately equidistant from the vertical sides. The front of the chamber was a hinged door which was left open during testing. The yarn sample was ignited at the bottom by means of a flame source (e.g. wooden match) which was withdrawn from the yarn sample after ignition. The yarn was permitted to burn until it extinguished. The resulting char material was then removed from the same and the sample was ignited again. The foregoing procedure was repeated until the sample was consumed. The yarn sample required 35 ignitions. A similar 100 strand sample prepared from 6 filament, 70 denier nylon 66 yarn was tested in the same manner. This sample required only 17 ignitions, illustrating that the yarns of the present invention are significantly more flame resistant than nylon 66 yarns.

EXAMPLE 2

This example illustrates the preparation of yarns made fromm block copolyamides of the present invention and the exceptional antistatic and flame-resistant properties of these yarns.

Using the procedure of Example 1, CEMPO/6 polymer was prepared from CEMPO-HMD salt solution in an autoclave. The polymer was extruded from the bottom of the autoclave in rod form, diced under an atmosphere of nitrogen, and placed in a dry box. 77.63 grams (0.344 moles) of nylon 66 polymer was then prepared in an autoclave from 90 grams of nylon 66 salt dissolved in water. Then, 28.64 grams (0.099 moles) of the previously prepared CEMPO/6 polymer was melted and added to the autoclave containing the finished molten nylon 66 polymer. The two polymers were stirred for about 20 minutes at 280° C. and then extruded from the bottom of the autoclave through a six-hole spinneret into yarn which was drawn to approximately 70 denier. The yarn was composed of a block copolymer which contained 2.9% by weight of phosphorus as an integral part of its polymer chain and consisted of recurring units of the same structure as units (1) and (2) of the random copolymer of Example 1, but in a mole ratio of about 78:22, units (1) to units (2). The yarn (2A) in the form of a knit tubing was tested to determine its antistatic properties using the test described in Example 1 except that the yarn in this instance was conditioned for 24 hours at 40% RH and 24° C. just prior to testing. The static decay half-life of this yarn sample was 5 seconds.

Another block copolymer was prepared in an autoclave using the foregoing procedure from 77.63 grams (0.344 moles) of nylon 66 polymer and 57.782 grams (0.165 moles) of CEMPO/AMPO polymer. CEMPO/AMPO polymer was prepared from CEMPO-AMPO salt using the procedure of Example 1. The resulting copolymer was extruded from the bottom of the autoclave through a six-hole spinneret into yarn which was drawn to approximately 70 denier. The yarn (2B) was composed of a block copolymer containing 2.9% by weight of phosphorus as an integral part of its polymer chain and consisted of recurring units of the formulas:

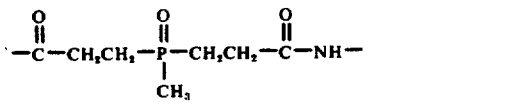

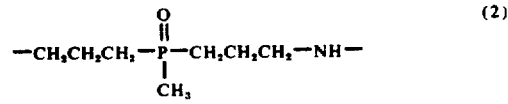

in a mole ratio of about 68:32, units (1) to units (2). The flame-resistant properties of the yarn were tested using the procedure described in Example 1. In this instance 38 ignitions were required to consume the yarn sample.

EXAMPLE 3

This example illustrates the preparation of yarns made from copolyamides of the present invention and the incorporation therein of a small amount of a polyether wax (referred to hereinafter as Wax A) as a separate phase. Wax A is prepared by reacting a polyether wax of the formula:

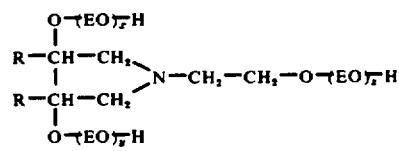

where R is $CH_3$-$(CH_2)$-15, EO is $-CH_2-CH_2-O-$, and the sum of $x+y+z$ is 50, with sufficient dimethyl(-terephthalate) (DMT) to increase its viscosity to about 10,000 cp at 100° C.

A random copolyamide was prepared from nylon 66 salt and CEMPO-HMD salt solution in an autoclave as described in example 1 to provide a molten copolyamide containing 1.5% by weight of phosphorus. To the molten copolyamide there was added and blended therewith 2.5% o.w.p. ( on weight of polymer) of Wax A. The resulting copolyamide/Wax A blend was extruded from the bottom of the autoclave into 6 filament yarn (Yarn 3A) which was drawn to approximately 70 denier as described in example 1. Using the same monomers and Wax A another yarn (Yarn 3B) was prepared by the same procedure. The amount of Wax A employed in this instance provided a yarn containing 5.6% o.w.p. Using the procedure of example 2, two yarns (Yarn C and D) were prepared from block copolymers of the present invention which contained Wax A dispersed therein by the procedure given above. One of the block copolyamides contained 2.8% by weight of phosphorus and 5.6% o.w.p. of Wax A and the other contained 3.0% by weight of phosphorus and 2.5% o.w.p. of Wax A.

The antistatic properties of the yarns were determined by measuring the static decay half-life of a sample of the yarns in the form of a knitted fabric using an instrument referred to as a Static Honestometer and manufactured by Shishido and Company, Ltd. In the determination each sample was mounted on the instrument and exposed to 10 KV (kilovolts) charge for 6 seconds to build up a charge on the sample surface. The charge and attenuation thereof were then detected in wave form with a synchroscope. A time exposure photograph was taken of the synchroscope picture during the entire determination. The amount of time required for the voltage on the sample surface to attenuate to one half its initial value was determined from the photograph. The fabric sample was home laundered as described in example 1 and then conditioned for 48 hours at 40% relative humidity (RH) and 24° C. just prior to making the determination. For purpose of comparison three fabric samples, made from 6 filament, 70 denier yarns of polyhexamethylene adipamide (nylon 66) were tested under identical conditions. One yarn sample, Control 3(a), contained 2.5% o.w.p. of Wax A, another yarn sample, Control 3(b), contained 5.6% o.w.p. of Wax A, and the third yarn sample, Control 3(c), contained no wax.

The results of the determinations are given in the following table.

TABLE II

| Yarn Sample | % Wax A | % P | Static Build Up (MV) | Static Decay Half-Life (sec.) |
|---|---|---|---|---|
| 3A | 2.5 | 1.5 | 113 | 7 |
| 3B | 5.6 | 1.5 | 181 | 4 |
| 3C | 2.5 | 3.0 | 106 | 3 |
| 3D | 5.6 | 2.8 | 106 | 3 |
| Control 3(a) | 2.5 | 0 | 194 | 29 |
| Control 3(b) | 5.6 | 0 | 188 | 19 |
| Control 3(c) | 0 | 0 | 116 | >900 |

The results shown in Table II demonstrate that the antistatic properties of yarns of the present invention are enhanced by incorporating a small amount of a polyether wax into the yarns, thereby enabling the use of less phosphorus reactant and yet, as will be shown in Example 4, providing acceptable flame-resistant yarns.

EXAMPLE 4

This example illustrates the exceptional flame-resistant properties of yarns made from copolyamides of the present invention and which contain a polyether wax incorporated therein.

Random and block copolyamides of the present invention containing Wax A were prepared following the procedures described in Example 3. The random copolyamides were prepared using nylon 66 salt and either CEMPO-HMD salt, AdOH-AMPO salt or CEMPO-AMPO salt. The block copolyamides were prepared using nylon 66 and CEMPO/6 polymer or CEMPO-AMPO polymer. Two 6 filament, 70 denier nylon 66 control yarns, one containing Wax A, were also prepared. The flame resistance of each of the resulting 6 filament, 70 denier yarns was determined by the test given in Example 1. The results of the determination are given in the following table.

TABLE III

| Yarn Sample | Phosphorus Reactant | Copolyamide Form | % Wax A | % P | Number of Ignitions |
|---|---|---|---|---|---|
| 4A | CEMPO-HMD | Random | 5.6 | 0.72 | 6 |
| 4B | '' | '' | 5.6 | 1.1 | 12 |
| 4C | '' | '' | 5.6 | 4.1 | 38 |
| 4D | AdOH-AMPO | '' | 5.6 | 1.6 | 10 |
| 4E | '' | '' | 5.6 | 2.3 | 17 |
| 4F | CEMPO-AMPO | '' | 5.6 | 2.9 | 17 |
| 4G | '' | '' | 5.6 | 3.5 | 27 |
| 4H | CEMPO/6 | Block | 5.6 | 1.2 | 10 |
| 4I | '' | '' | 2.5 | 2.6 | 20 |
| 4J | CEMPO/AMPO | '' | 5.6 | 2.2 | 16 |
| 4K | '' | '' | 2.5 | 3.0 | 26 |
| Control a Nylon 66 | — | — | 5.6 | — | 5 |
| Control b Nylon 66 | — | — | — | — | 15 |

The results in Table III clearly show the adverse effects of a polyether wax on the flame resistance of nylon 66 (controls a and b). The results also clearly show that yarns prepared from copolyamides of the present invention, even when a relatively large amount of a polyether wax is incorporated therein, surprisingly have good flame-resistant properties. When the copolyamides contain more than about 2.2% by weight of phosphorus, the yarns have flame-resistant properties surpassing that of nylon 66. Amazingly, when the copolymers contain 3% or more by weight of phosphorus, the yarns approach the flame-resistant properties of self-extinguishing yarns (4C, 4G and 4K).

EXAMPLE 5

This example illustrates the excellent moisture regain properties of yarns made from copolyamides of the present invention.

Three 6 filament, 70 denier yarns (5S, 5B and 5C) were made from nylon 66 salt and CEMPO-HMD salt using the technique described in Example 1. Another 6 filament, 70 denier yarn (5D) was made from nylon 66 and CEMPO/6 polymer using the technique described in Example 2.

A sample of each of the yarns was dried at 60° C. in a vacuum oven at about 10 mm. Hg for 4 hours, then exposed at 24° C. for 48 hours in air having a relative humidity (RH) of 72° . Each yarn was weighed and then dessicated in a vacuum oven at 60° C. for 24 hours and weighed again. The difference in weight is the amount of moisture in the yarn at 72% RH. This value was then converted to a percentage of moisture (% moisture regain) in the yarn. The % moisture regain of each yarn is given in the following table.

TABLE IV

| Yarn | % P | Copolyamide Form | Moisture Regain, % |
|---|---|---|---|
| 5A | 3.0 | Random | 7.73 |
| 5B | 3.2 | '' | 7.98 |
| 5C | 6.0 | '' | 12.00 |
| 5D | 2.9 | Block | 8.89 |
| Control (Nylon 66) | — | — | 4.07 |

EXAMPLE 6

This example illustrates the exceptional moisture transport properties of yarns made from copolyamides of the present invention.

Three yarns (6A, 6B and 6C) were prepared from nylon 66 salt and CEMPO-HMD salt. Two yarns (6D and 6E) were prepared from nylon 66 and CEMPO/6-polymer. Wax A was incorporated into yarns (6B, 6C and 6E). Two nylon 66 control yarns, one containing Wax A, were also prepared. All yarns were 6 filament, 70 denier yarns and were prepared in the manner described in the previous examples. The moisture transport of each of the yarns was determined by preparing single layer knit tubing fabrics from each of the yarns and stretching each of the fabrics over a metal frame. A droplet of water from an ordinary eye dropper was placed on each of the stretched fabrics. The amount of time in seconds required for the droplet of water to dissipate into each of the fabrics was recorded. The determinations were run at 25° C. and 40% R.H. The time values given in the following table represent an average of five determinations.

TABLE V

| Yarn | % P | % Wax | Copolyamide Form | Moisture Transport (sec.) |
|---|---|---|---|---|
| 6A | 1.5 | — | Random | 33 |
| 6B | 1.5 | 5.6 | '' | 10 |
| 6C | 3.2 | 5.6 | '' | <1 |
| 6D | 3.9 | — | Block | 18 |
| 6E | 2.6 | 1.5 | '' | 18 |
| Control (a) nylon 66 | — | — | — | 307 |
| Control (b) nylon 66 | — | 5.6 | — | 24 |

Moisture regain and moisture transport properties of yarns contribute to the comfort of fabrics made therefrom. Accordingly, it is important in textile apparel application that yarn have good moisture regain and moisture transport properties. The results in Tables IV and V show that the yarns of the present invention have exceptional moisture regain and moisture transport properties.

EXAMPLE 7

This example illustrates that the phosphorus is permanently incorporated into yarns made from copolyamides of the present invention and therefore provide yarns having permanent antistatic flame-resistant, moisture regain and moisture transport properties.

Knitted fabrics of Yarns 1A–1D, 2A and 2B were machine washed as described in Example 1 and/or scoured. When the fabrics were scoured, the same procedure was used as in the machine washing of the fabrics except that the fabrics were agitated for 60 minutes in 60° C. water containing a surfactant (mixture of 1.5% Alkanol N.P. and 2.0% ammonium sulfate) and a water softener (0.25% Calgon) in a weight ratio of 40:1, water to surfactant and water softener; the percentages of surfactant components and water softener are by weight based on the weight of fabric. The fabric samples were then analyzed to determine the phosphorus content thereof by the the x-ray fluorescent technique. In each case 92–98% of the initial phosphorus was found.

The whiteness, tensile properties, elongation, dye light-fastness and light stability of the yarns were also determined and found to be comparable to that of nylon 66 fabric yarn control samples. The fabric samples of Yarns 1A–1D, 2A and 2B were observed to have a sparkle greater than that observed for nylon 66 fabrics.

EXAMPLE 8

This example illustrates the preparation of a random copolyamide of the present invention containing recurring units of the formula

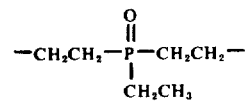

To a stainless steel, high pressure autoclave there was charged 90 grams (0.344 moles) of nylon 66 salt and 20.94 grams (0.062 moles) of CEEPO-HMD salt in 50 ml. of water. The CEEPO-HMD salt was prepared in the same way as the CEMPO-HMD salt described in Example 1. The contents of the autoclave were treated using the same procedure described in Example 1 to provide a molten copolymer which was then melt-spun directly from the bottom of the autoclave through a six-hole spinneret into yarn. The yarn was drawn to approximately 70 denier, contained 2% by weight of phosphorus as an integral part of its polymer chain and consisted essentially of recurring units of the formulas:

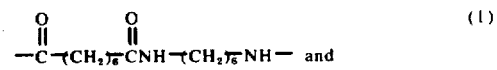 (1)

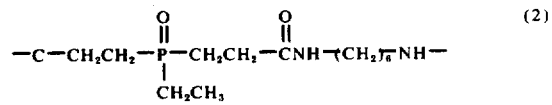 (2)

in a mole ratio of about 85:15, units (1) to units (2)

The static decay half-life of a sample of the yarn in the form of a knit tubing was determined at 50% relative humidity using the procedure described in Example 1 and was found to be 30 seconds. Also, the flame-resistance of the yarn was determined using the procedure described in Example 1. In this instance 27 ignitions were required to consume the yarn sample. Additionally, the moisture regain of the yarn was determined using the procedure described in Example 5 and was found to be 6.8%.

COMPARATIVE EXAMPLE

Prior art phosphorus-containing polyamide yarns were prepared using the procedure of Example 1. Yarn CA was prepared from nylon 66 salt and the salt of

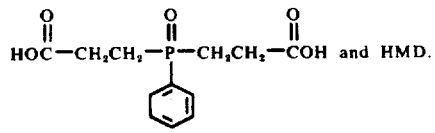

Yarn CB was prepared from nylon 66 salt and the salt of

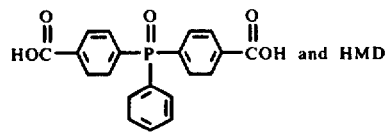

The static decay half-life ($t_{1/2}$) at 40 and 50% RH and moisture regain at 72% RH and 24° C. of the yarns were determined using the procedures of Examples 1 and 5, respectively.

TABLE VI

| Prior Art Yarns | % P | $t_{1/2}$ (sec) 40% (RH) | 50% | Moisture Regain (%) | Copolyamide Form |
|---|---|---|---|---|---|
| CA | 3.14 | — | 255 | 5.55 | Random |
| CB | 3.20 | 2820 | 404 | 4.72 | " |
| Yarns of the Invention | | | | | |
| Yarn 1B | 3.20 | 7 | 2 | — | Random |
| Yarn 5B | 3.20 | — | — | 7.98 | " |
| Yarn 5D | 2.90 | — | — | 8.89 | Block |
| Control Yarn | | | | | |
| Nylon 66 | 0 | 2820 | 390 | 3.62 | Homopolymer |

The results shown in Table VI show that yarns prepared from prior art phosphorus containing monomers having poor antistatic properties, if any, and inferior moisture regain properties when compared to yarns of the present invention. The prior art yarns have substantially the same antistatic properties as nylon 66 yarn, whereas yarns of the present invention have antistatic properties which are many magnitudes better than nylon 66 yarn.

We claim:

1. A fiber-forming copolyamide consisting essentially of recurring units selected from the group consisting of

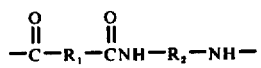  (I)

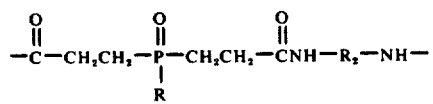  (II)

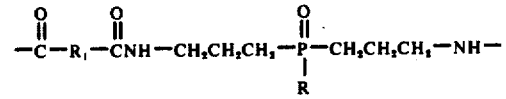  (III)

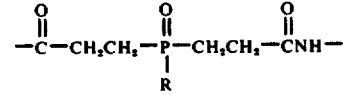

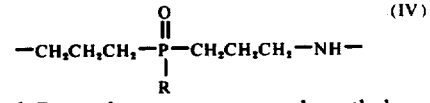  (IV)

wherein $R_1$ and $R_2$ each represents a polymethylene radical having from 4 to 12 carbon atoms, and R represents an alkyl having from 1 to 4 carbon atoms, wherein successive R, $R_1$ and $R_2$ radicals when present in the polymer units may be the same or different and wherein the copolyamide contains a sufficient amount of units selected from units (II) to (IV) to provide a copolyamide containing between about 0.5 and about 7.5% by weight of phosphorus as an integral part of its polymer chain.

2. The copolyamide of claim 1 wherein R is methyl or ethyl.
3. The copolyamide of claim 1 wherein R is methyl.
4. The copolyamide of claim 1 wherein the copolyamide consists essentially of units (I) and (III) in which $R_1$ represents tetramethylene, $R_2$ represents hexamethylene and R represents methyl or ethyl.
5. The copolyamide of claim 4 wherein R is methyl.
6. The copolyamide of claim 1 in the form of a fiber.
7. The copolyamide of claim 1, wherein the copolymer contains between 2 and 6% by weight of phosphorus as an integral part of its polymer chain.
8. The copolyamide of claim 5 in the form of a fiber.